United States Patent [19]

Schalz

[11] Patent Number: 5,086,564
[45] Date of Patent: Feb. 11, 1992

[54] DEVICE AND METHOD FOR ACTIVE VIBRATION DAMPING

[75] Inventor: Karl-Josef Schalz, Weilburg, Fed. Rep. of Germany

[73] Assignee: Wild Leitz GmbH, Wetzlar, Fed. Rep. of Germany

[21] Appl. No.: 506,344

[22] Filed: Apr. 9, 1990

[30] Foreign Application Priority Data

Apr. 7, 1989 [DE] Fed. Rep. of Germany ....... 3911341

[51] Int. Cl.$^5$ .............................................. G01B 5/03
[52] U.S. Cl. ...................................... 33/1 M; 33/503; 248/638; 248/550; 188/378
[58] Field of Search .................... 33/503, 1 M, 702; 248/638, 550; 188/378, 379

[56] References Cited

U.S. PATENT DOCUMENTS

| | | | |
|---|---|---|---|
| 2,966,124 | 12/1960 | Casey | 188/379 |
| 3,464,657 | 9/1969 | Bullard | 248/550 |
| 4,458,862 | 7/1984 | Mouille et al. | 188/379 |
| 4,633,982 | 1/1987 | Swigert | 188/379 |
| 4,635,892 | 1/1987 | Baker | 248/550 |
| 4,795,123 | 1/1989 | Forward et al. | 248/550 |
| 4,796,873 | 1/1989 | Schubert | 248/550 |
| 4,798,006 | 1/1989 | Barnaby | 33/573 |
| 4,958,437 | 9/1990 | Helms | 33/503 |

FOREIGN PATENT DOCUMENTS

| | | | |
|---|---|---|---|
| 261859 | 11/1988 | German Democratic Rep. | |
| 0286634 | 12/1986 | Japan | 248/638 |
| 0242846 | 9/1989 | Japan | 248/638 |
| 0288647 | 11/1989 | Japan | 248/638 |
| 0571642 | 9/1977 | U.S.S.R. | 248/550 |
| 1414972 | 8/1988 | U.S.S.R. | 188/378 |
| 2165667 | 4/1986 | United Kingdom | |

Primary Examiner—Thomas B. Will
Attorney, Agent, or Firm—Foley & Lardner

[57] ABSTRACT

A device and method for active vibration damping of an object which comprises a beam with two free ends comprises a vibration sensor, a control circuit, and an actuator. The sensor is located near the first end of the beam and the actuator is located near the second end of the beam. The control circuit converts input signals from said vibration sensor into control signals for controlling the actuator. The damping device is particularly useful where it forms part of a precision coordinate measuring machine which has a beam of varying length. In this instance, the sensor is located on a sliding spindle of the measuring machine.

20 Claims, 1 Drawing Sheet

DEVICE AND METHOD FOR ACTIVE VIBRATION DAMPING

BACKGROUND OF THE INVENTION

The invention relates to a device for active vibration damping of an object, with a vibration sensor, a control circuit and an actuator.

Such devices are also known as "active damping systems" in robot technology; there, the vibration of the free end of a beam is damped, and the beam is mounted at its other end in a rotary joint and is to be brought by a drive to a desired angular position relative to this joint. Apart from the control of this drive by various sensor arrangements, a sensor and an actuator are also united at the free end of the beam. Controllable electromagnetic linear drives with moved inert masses are known, for example, as actuators. This is described, for example, in H.—B. Kuntze, Position Control of Industrial Robots-Impacts, Concepts and Results, Symposium Robot Control, October 5–7, Karlsruhe, in particular FIG. 9.

Accuracy, speed and the accessible measurement region of measurements are increasingly common requirements in precision measuring machines. To increase accuracy, vibrations have to be suppressed, generally requiring rigid structures with large masses. However, rigid structures with large masses hinder rapid travel. A larger measurement region necessitates large structural lengths and travel paths, so that the greatest possible accelerations and travel speeds are striven for, thus accentuating the requirements for vibrational rigidity and light construction. A critical component here is the spindle, which has to be accelerated in each direction, and the free length of which must greatly change in order to achieve a large measurement region. Its bending vibrations are hence considerable, but the variable lengths are however prejudicial to the use of conventional damping means.

An objection to the arrangement of an active damping system with united arrangement of sensor and actuator is that the device then disturbs the spindle end with not inconsiderable mass and constructional size. The action of the actuator is, in addition, then dependent or the free length of the spindle.

SUMMARY OF THE INVENTION

The object of the invention is to provide a device of this category for active vibration damping, which has in particular been developed for vibration damping of beams of variable length.

According to one aspect of the invention, the damping device may be mounted on a beam that is firmly attached to a support member at a clamping point and which has first and second free ends extending in opposite directions from said clamping point. The damping device comprises a vibration sensor attached to the beam near the first end and an actuator attached to the beam near the second end. A control circuit receives signals from the vibration sensor and transmits control signals to the actuator.

The control circuit may comprise a preamplifier, a low pass filter, and a delay device which changes the phase of the control signal so that it is 90 degrees out of phase with respect to the input signal.

The actuator according to this aspect of the invention may consist of an electromagnetic vibration generator and a viscous damper. The electromagnetic vibration generator preferably consists of a vibratory body which is suspended by a leaf spring guide and a magnetic coil which is actuated by the control signals and which surrounds at least part of the vibratory body.

Another object of the invention is to provide a precision coordinate measuring machine with active vibration damping.

This object is achieved by providing a measuring machine which comprises a slide mounted on a crosshead and has first and second ends extending in opposite directions therefrom. A spindle is slideably mounted in the first end of the beam and extends longitudinally therefrom. A probe and a vibration sensor are mounted on the spindle proximate to one another, and an actuator means is mounted on the second end of the slide to actively damp vibrations of the measuring machine. A control means receives signals from the vibration sensor and outputs control signals to the actuator means.

Still another object of the invention is to provide a method of actively damping vibrations in an object mounted at a clamping point to a support member and which has first and second ends extending in opposite directions from the clamping point. The inventive method senses vibrations induced at the first end of the beam which are induced when the beam undergoes acceleration in a predetermined direction and subsequently produces input signals indicative of these vibrations. These input signals are then converted to control signals, and the vibrations of the object are actively damped in accordance with the control signals.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention will be described in further detail with reference to the drawings, in which.

DETAILED DESCRIPTION OF THE PREFERRED EMBODIMENT

Figure 1:
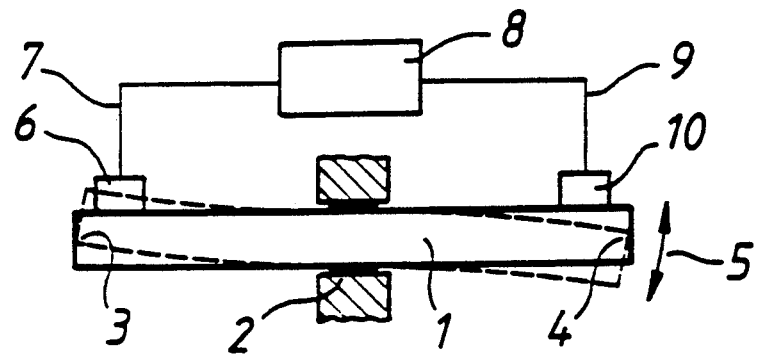
FIG. 1 shows a conceptual representation of a beam with a device for active vibration damping.

FIG. 1 shows a beam 1 which is clamped in a mounting 2 at a clamping point at about (approximately) its center. Its first end 3 and its second end 4 are deflected by a bending vibration shown by arrow 5 when the beam 1 is accelerated, e.g., pushed, via the mounting 2.

A sensor 6 at the first end 3 senses the motion of the first end 3 and emits a signal via a signal lead 7 to the control circuit 8. The sensor 6 can emit as the signal, for example, a voltage which is proportional to the acceleration.

The control circuit 8 contains a power supply, a preamplifier, a low pass filter as an interference filter, a delay device for phase matching, and an output amplifier with an amplitude limiter, and converts the input signal coming from the sensor 6 into a control signal which is passed via the signal lead 9 to the actuator 10.

The actuator 10 contains a vibration generator. This is constructed, e.g., on the principle of a loudspeaker, but moves a heavy ballast instead of the diaphragm. Other linear drives are also possible. In addition, the actuator 10 contains a damping element, in particular, a viscous damper. The actuator 10 is fitted near the second end 4 of the beam 1.

A bending vibration of the beam 1 is excited by acceleration of the mounting 2, e.g. on an impulse. The vibration is damped by internal friction in the beam 1, but the decay time is, however, undesirably large. The actuator 10 acts on this vibrating system with an external force which is controlled by the sensor 6 via the control circuit 8. This external force is then applied such that it acts as an additional damping device, and to a large extent the aperiodic boundary case of the vibration is reached with the shortest decay time. For this purpose, the actuator 10 moves the heavy ballast in the direction of vibration of the beam 1 with the vibration frequency of the latter, but with a phase displacement of 90°. Resonance behavior of the whole assembly is excluded by the damping element in the actuator 10 and by suitable amplitude limiting by the control circuit 8 for the actuator 10.

A single device of this kind can damp only the portions of the vibration of the beam 1 in the direction in which the sensor 6 and the actuator 10 act.

Therefore, several devices are provided, if necessary with a differently directed arrangement of sensor 6 and actuators 10, in order to damp various forms of vibration. Torsional vibrations of drive shafts, for example, can thus be damped with a device of this kind.

A specific application of a device of this kind for active vibration damping will be explained with reference to FIG. 2.

The beam 1 is here embodied as the y-slide 1 of a precision coordinate measuring machine. Its length is variable, since the integrated z-spindle 11 is displaceable longitudinally of the beam 1 by a drive 13. The shortest beam length is, e.g., 4 m and the greatest beam length is, e.g. 6.5 m.

With the shortest beam length, i.e., with the z-spindle 11 on the top stop, the mounting 2 is about central between the second end 4 and the first end corresponding to first end 3 in FIG. 1, which is formed here as the probe 31 on the z-spindle 11. The distance between the first end and the mounting 2 thus varies from about 2 m to about 4.5 m.

The mounting 2 is constructed as a y-guide crosshead, against which the y-slide is displaceable in the y-direction, firmly pressed (held) on all sides by air bearings or roller bearings 22.

By the accelerations produced when the y-slide is displaced on the y-guide crosshead, the y-slide is excited to vibrate, in particular with tilting vibrations in the y-direction (into the page with respect to FIG. 2) about the mounting 2 with typical frequencies of 10-30 Hz and amplitudes at the sensing tip 31 in the region of 30 $\mu$m. The specific constructional parameters of the z-spindle 11, i.e., the length of the beam 1, are of course determinative here for the exact values.

Since the required measurement accuracy is less than 1 $\mu$m, these vibrations must have died out at the moment when the measurement is taken by the precision coordinate measuring machine. A passive vibration damping cannot effectively intervene, because of the dependence of the vibration on the position of the z-spindle 11.

A vibration sensor 6 is therefore provided on the z-spindle 11 near the probe, at a distance of about 10 cm-30 cm. A Q-Flex QA700 acceleration sensor (Sundstrand) is for example suitable for this. The sensor 6 is connected via signal leads 71, 72 to the control circuit 8 which converts input signals to control signals. The latter consists of a preamplifier 81, a low pass filter 82 as an interference filter, a delay device 83 for phase matching, and an output amplifier 84 with amplitude limiting. The low pass filter 82 filters out interference. It can be appropriate to make the amplification or frequency response of the control circuit dependent on the beam length and thus on the position of the z-spindle 11. For this purpose, the control circuit 8 can receive control signals from a control circuit 15 via a lead 16, to control the drive 13 of the z-spindle 11 via a lead 14. Control circuit 15 comprises a z-monitoring circuit which monitors the position of z-spindle 11 and emits an output signal to control circuit 8 to change the control characteristics thereof.

The control circuit 8 controls a magnet coil 101 of an actuator 10 via leads 91, 92. The magnet coil 101, which forms an electromagnetic vibration generator, surrounds a projection 102 of magnetic material of the vibratory body 103 with a mass of e.g. 10 kg. This vibratory body is suspended in the region of the second end 4 of the y-slide 1 by a leaf spring parallel guide 104. Furthermore, the vibratory body 103 is coupled via a viscous damper 105 to the y-slide 1.

The magnet coil 101, under the control of the control circuit 8, produces vibrations of the vibratory body 103 with the frequency (10-30 Hz) of the beam vibration, as picked up by the sensor 6, and with an amplitude of up to about 1 mm, i.e., substantially greater than the deflection to be damped. The phase displacement of 90° suitable for damping the vibration is achieved in the control circuit by a suitable time delay (83) between the signal of the sensor and the output signals of the control circuit 8. The phase relationship of the signal of the sensor 6 to the vibratory motion at the sensor 6 is also to be taken into account here.

Figure 2:
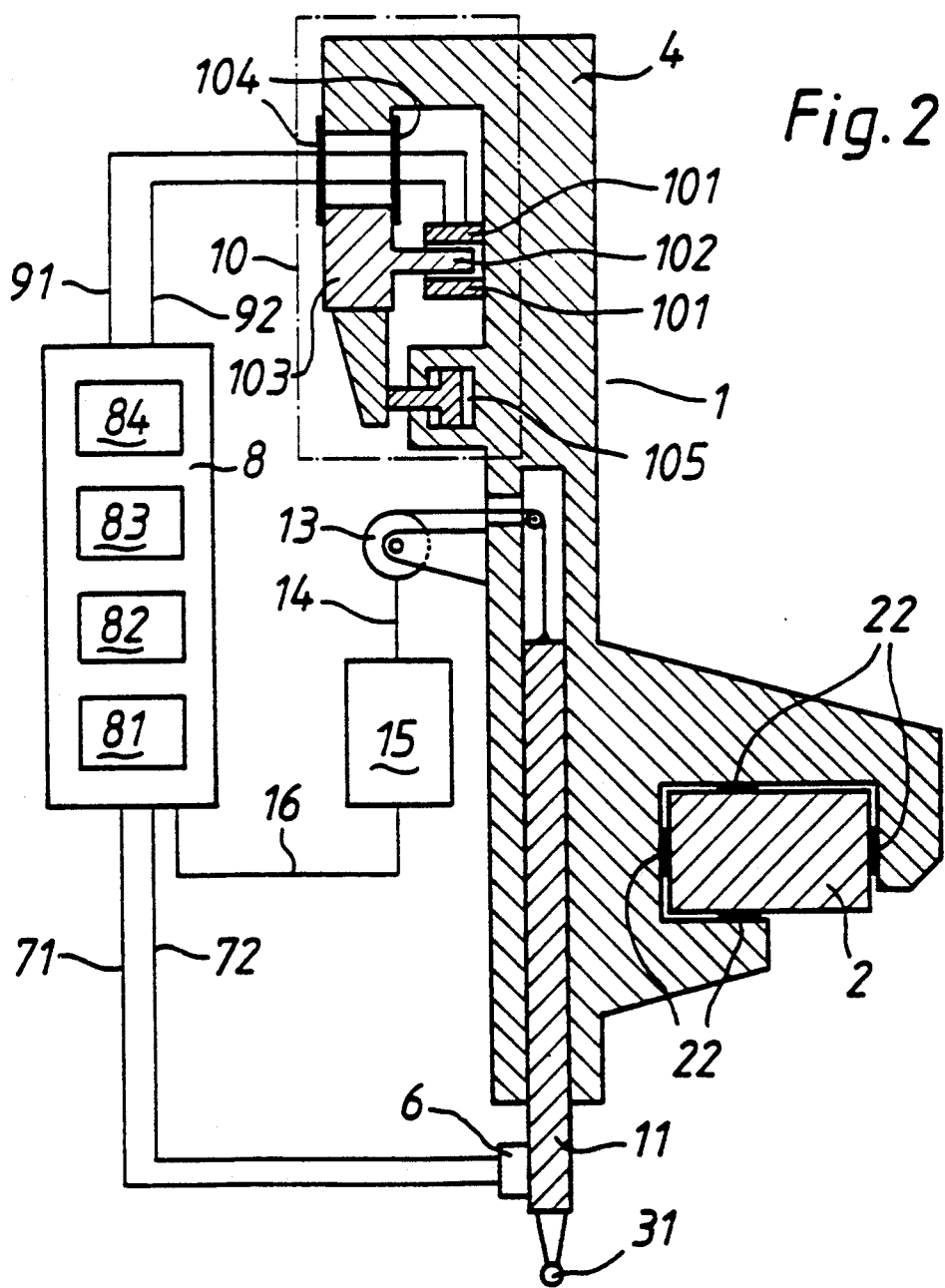
FIG. 2 shows schematically the y-slide with z-spindle, sensor and active damping system for a precision coordinate measuring machine.

To simplify the representation, an arrangement of the sensor 6 and actuator 10 in the x-direction perpendicular to the direction y of displacement of the y-slide 1 is shown in FIG. 2. To damp the described most important vibration, that is, the tilting vibration in the y-direction, the sensor 6 and the actuator 10 are, however, to be arranged turned through 90° in the y-direction.

Several devices for active vibration damping can also be used in a precision coordinate measuring machine for the active vibration damping of various vibrations.

Utilization is of course not restricted to the embodiment shown with a vertical spindle (z-direction). The embodiment, which is likewise possible, of a coordinate measuring machine with a horizontal spindle can be damped in the same manner.

I claim:

1. A device for active vibration damping of an object, said object comprising a beam firmly attached to a support member at a clamping point and having first and second free ends extending in opposite directions from said clamping point, said active vibration damping device comprising:

(a) a vibration sensor which is attached to said beam near said first free end and which generates input signals;

(b) an actuator which is attached to said beam near said second free end and which, when activated, actively damps vibrations in said beam, said actuator comprising a vibration generator and a viscous damper; and (c) an electronic control circuit which is connected to said vibration sensor and an output connected to said actuator, said control circuit receiving said input signals emitted from said vibration sensor and transmitting electronic control signals to said actuator to activate said actuator to actively damp vibrations in said beam.

2. The device of claim 1, wherein the length of said beam is variable such that the distances of said first end and of said vibration sensor from said clamping point are variable.

3. The device of claim 1, wherein said control circuit comprises a delay device and an output amplifier with amplitude limiting, an output of said delay device being connected to an input of said output amplifier.

4. The device of claim 3, wherein said control circuit further comprises a preamplifier and a low pass filter, an output of said preamplifier being connected to an input of said low pass filter and an output of said low pass filter being connected to an input of said delay device.

5. The device of claim 1, wherein said control circuit comprises a delay device for changing the phase of the control signals of said control circuit with respect to the phase of the input signals.

6. The device of claim 5, wherein the phase difference produced by said delay device is 90 degrees.

7. The device of claim 1, wherein said actuator comprises an electromagnetic vibration generator.

8. The device of claim 7, wherein said electromagnetic vibration generator comprises a leaf spring guide, a vibratory body suspended by said leaf spring guide, and a magnet coil which surrounds at least part of said vibratory body.

9. The device of claim 1, wherein said beam comprises a slide of a precision coordinate measuring machine, and wherein said support member comprises a guide crosshead, against which the slide is displaceable.

10. A precision coordinate measuring machine comprising:
(a) a crosshead;
(b) a slide mounted on said crosshead and having first and second free ends extending in opposite directions therefrom;
(c) a spindle slideably mounted in said slide and extending longitudinally from said first free end of said slide;
(d) a probe attached to said spindle;
(e) a vibration sensor mounted on said spindle proximate said probe and generating electronic input signals;
(f) an actuator means, mounted on said slide proximate said second free end and responsive to said vibration sensor, for actively damping vibrations of said measuring machine, said actuator means comprising a vibration generator and a viscous damper; and
(g) a control means for receiving said electronic input signals emitted from said vibration sensor and for transmitting electronic control signals to said actuator means, thereby activating said actuator means to cause said actuator means to actively damp the vibrations sensed by said vibration sensor.

11. The machine of claim 10, wherein said control means comprises a delay circuit and an output amplifier with amplitude limiting, an output of said delay circuit being connected to an input of said output amplifier.

12. The machine of claim 11, wherein said control means further comprises a preamplifier and a low pass filter, an output of said preamplifier being connected to an input of said low pass filter and an output of said low pass filter being connected to an input of said delay device.

13. The machine of claim 10, wherein said control means further comprises a delay device for changing the phase of said control signals with respect to the phase of said input signals.

14. The machine of claim 13, wherein the phase difference produced by said delay device is 90 degrees.

15. The machine of claim 10, wherein said actuator means comprises an electromagnetic vibration generator.

16. The machine of claim 15, wherein said electromagnetic vibration generator comprises a leaf spring guide, a vibratory body suspended by a leaf spring guide, and a magnet coil which surrounds at least part of said vibratory body.

17. The machine of claim 10, further comprising a control circuit means for displacing said spindle within said slide, and for monitoring the position of said spindle and emitting a signal to said control means, wherein the control means changes the control characteristics of the control signal emitted therefrom in response to the signal received from said control circuit means.

18. A method of actively damping vibration of an object which is mounted at a clamping point to a support member and which has first and second free ends extending in opposite directions from said clamping point, comprising the steps of:
(a) sensing vibrations induced at said first end of said object when said object is accelerated in a given direction and subsequently producing electronic input signals indicative of said sensed vibrations; then
(b) converting said input signals to electronic control signals and transmitting said control signals to an actuator comprising a vibration generator and a viscous damper; and then
(c) activating said actuator to actively damp vibrations of said object in accordance with said control signals.

19. The method of claim 18, wherein said step of converting said input signals to control signals comprises the steps of preamplifying said input signals, and then delaying the generation of said control signals so that said control signals are 90 degrees out of phase from said input signals.

20. The method of claim 18, wherein said step of actively damping said vibrations comprises the steps of activating a magnetic coil to produce vibrations in a vibratory body that are 90 degrees out of phase with the vibrations of said object, and viscously damping the vibrations of said vibratory body.

* * * * *